(12) United States Patent
Blust et al.

(10) Patent No.: US 7,093,886 B2
(45) Date of Patent: Aug. 22, 2006

(54) VEHICLE DOOR BEAM WITH REINFORCED TAB AND METHOD FOR MAKING THE SAME

(75) Inventors: Jason A. Blust, Waterford, MI (US); Erik S. Johnson, Warren, MI (US); Atalolo Dagba, Utica, MI (US); Joseph C. Kollaritsch, Clarkston, MI (US)

(73) Assignee: Benteler Automotive Corporation, Auburn Hills, MI (US)

( * ) Notice: Subject to any disclaimer, the term of this patent is extended or adjusted under 35 U.S.C. 154(b) by 47 days.

(21) Appl. No.: 11/015,372

(22) Filed: Dec. 17, 2004

(65) Prior Publication Data

US 2006/0131927 A1   Jun. 22, 2006

(51) Int. Cl.
*B60J 5/00* (2006.01)
(52) U.S. Cl. .................................... 296/146.6
(58) Field of Classification Search ............. 296/146.6
See application file for complete search history.

(56) References Cited

U.S. PATENT DOCUMENTS

| | | | | |
|---|---|---|---|---|
| 5,034,580 A * | 7/1991 | Tada et al. ............ 200/61.45 R |
| 5,281,780 A * | 1/1994 | Haland ....................... 200/52 R |
| 5,307,896 A | 5/1994 | Taguchi et al. |
| 5,311,963 A * | 5/1994 | Shigeoka et al. ...... 296/203.02 |
| 5,435,409 A * | 7/1995 | Meyer et al. ................ 180/274 |
| 5,544,716 A * | 8/1996 | White ....................... 280/730.2 |
| 5,573,298 A * | 11/1996 | Walker et al. ........... 296/146.6 |
| 5,749,600 A * | 5/1998 | Yamada et al. ......... 296/187.05 |
| 5,793,005 A | 8/1998 | Kato |
| 5,865,496 A * | 2/1999 | Odan et al. .............. 296/146.6 |
| 5,934,703 A * | 8/1999 | Mimura et al. ............. 280/734 |
| 5,992,922 A * | 11/1999 | Harbig et al. ............ 296/146.6 |
| 6,093,897 A * | 7/2000 | Inoue et al. .......... 200/61.45 R |
| 6,227,609 B1 * | 5/2001 | Mellis ....................... 296/146.6 |
| 6,460,648 B1 | 10/2002 | Kleinberg |
| 6,591,577 B1 * | 7/2003 | Goto et al. .............. 296/146.6 |
| 6,688,671 B1 * | 2/2004 | Fukutomi ................. 296/146.6 |
| 6,717,078 B1 | 4/2004 | Yoshida et al. |
| 6,896,314 B1 * | 5/2005 | Guiles ...................... 296/146.6 |

\* cited by examiner

*Primary Examiner*—Kiran B. Patel
(74) *Attorney, Agent, or Firm*—Price, Heneveld, Cooper, DeWitt & Litton, LLP

(57) ABSTRACT

A structural door beam for vehicles includes an elongate open channel with an open section configuration defined by a central web and at least one side flange. A mounting tab projects outwardly from a side edge of the side flange and has a marginal edge surrounding a generally planar mounting surface configured to support a vehicle motion sensor. An integral reinforcing flange extends along portions of the side flange edge and the mounting tab edge and protrudes laterally at a predetermined angle to define an integral buttress which stiffens the mounting tab to avoid inadvertent activation of the vehicle motion sensor. An integral bead may also be provided to reinforce the mounting tab.

29 Claims, 2 Drawing Sheets

VEHICLE DOOR BEAM WITH REINFORCED TAB AND METHOD FOR MAKING THE SAME

BACKGROUND OF THE PRESENT INVENTION

The present invention relates to motor vehicles and the like, and in particular to a structural door beam therefor having an integrated reinforcement feature to avoid inadvertent activation of a vehicle motion sensor mounted on the door beam.

Structural door beams are designed to protect vehicle occupants from injury during a side impact collision. When properly designed, the structural door beam should have high rigidity in a direction transverse to the direction of the force applied during a side impact automobile collision. Frequently, the structural door beams carry a vehicle motion sensor that detects impact. The motion sensor relays a signal to an inflation device activating one or more air bags to protect occupants inside the vehicle. A problem that sometimes occurs is that the motion sensor will interpret vehicle vibrations, such as those generated by the vehicle's sound system, as a collision, and subsequently activate the inflation device and the associated air bags. Inadvertent activation of the air bags is dangerous to automobile occupants, and is expensive to repair. Consequently, a structural door beam that provides reinforcement to the portion of the structural door beam that carries the vehicle motion sensor, maintains the structural integrity of the door to meet safety requirements, yet adds no significant cost to manufacture, would be advantageous and would represent a significant advancement in door beam technology.

SUMMARY OF THE INVENTION

One aspect of the present invention is a structural door beam for vehicles, which includes an elongate open channel with an open section configuration defined by a central web and at least one side flange. A mounting tab projects outwardly from a side edge of the side flange and has a marginal edge surrounding a generally planar mounting surface configured to support a vehicle motion sensor. An integral reinforcing flange extends along portions of the side flange edge and the mounting tab edge and protrudes laterally at a predetermined angle to define an integral buttress which stiffens the mounting tab to avoid inadvertent activation of the vehicle motion sensor.

Another aspect of the present invention is a method for making a structural door beam for vehicles, which includes forming from a strip of steel an elongate channel having an open section configuration defined by a central web and at least one side flange extending along one side of the central web and having an outwardly projecting side edge. A mounting tab is integrally formed with and projects outwardly from the side edge of the side flange, and has a marginal edge surrounding a generally planar mounting surface configured to support a vehicle motion sensor thereon. A reinforcing flange is integrally formed with and extends continuously along a predetermined portion of the side edge of the side flange, and a predetermined portion of the marginal edge of the mounting tab. The reinforcing flange protrudes laterally at a predetermined angle relative to the mounting surface of the mounting tab. The reinforcing flange defines an integral buttress which stiffens the mounting tab to avoid inadvertent activation of the vehicle motion sensor mounted thereon.

Yet another aspect of the present invention is a structural door beam for vehicles, which includes an elongate channel having an open section configuration defined by a central web and at least one side flange extending along one side of the central web. A mounting tab projects outwardly from the side flange and has a marginal edge surrounding a generally planar mounting surface configured to support a vehicle motion sensor thereon. An integral reinforcing bead extends transversely along a predetermined portion of the mounting surface of the mounting tab and an adjacent portion of the side flange. The reinforcing bead defines an integral buttress which stiffens the mounting tab to avoid inadvertent activation of the vehicle motion sensor thereon.

Another aspect of the present invention includes a method for making a structural door beam for vehicles, which comprises the steps of forming from a strip of steel an elongate channel having an open section configuration defined by a central web and at least one side flange extending along one side of the central web. A mounting tab is integrally formed which projects outwardly from the side flange and has a marginal edge surrounding a generally planar mounting surface configured to support a vehicle motion sensor thereon. A reinforcing bead is integrally formed which extends transversely along a predetermined portion of the mounting surface of the mounting tab and an adjacent portion of the side flange to define an integral buttress. The integral buttress stiffens the mounting tab to avoid inadvertent activation of the vehicle motion sensor mounted thereon.

Flange and bead reinforcement features allow the tabs to be reinforced and stabilized, while avoiding multiple piece assemblies. Also, these reinforcement features are formed during the initial forming process, thereby eliminating secondary operations and complex geometries. Further, the overall weight of the component can be greatly optimized since there are not additional parts being added. Since the reinforcement features are formed in the same blank as the tab, the material properties are homogenous. In addition, the geometries of the reinforcement features are adjustable which optimize tab performance. Furthermore, the reinforcement features provide versatility to the mounting tab, making it useful for other applications, such as a sensor mounting surface, wire harness run, secondary beam attachment point, etc.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
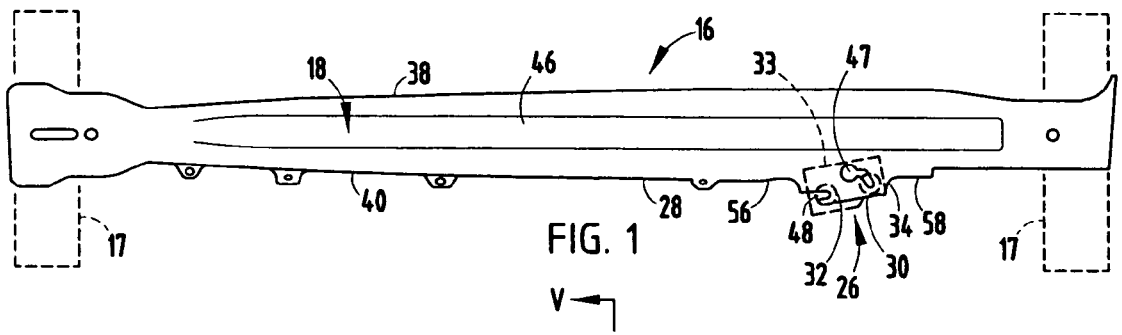
FIG. 1 is a front elevational view of a structural door beam embodying the present invention shown installed in a vehicle door.

For purpose of description herein the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 16 (FIG. 1) generally designates a structural door beam 16 embodying the present invention, which is particularly adapted for use in motor vehicles. The structural door beam is further adapted to be secured to support structures 17 in the vehicle door. The structural door beam 16 includes an elongate open channel 18 with an open section configuration defined by a central web 22 and at least one side flange 24. A mounting tab 26 projects outwardly from a side edge 28 of the side flange 24 and has a marginal edge 30 surrounding a generally planar mounting surface 32 configured to support a vehicle motion sensor 33. An integral reinforcing flange 34 extends along portions of the side flange edge 28 and the marginal edge 30 and protrudes laterally at a predetermined angle α to define an integral buttress which stiffens the mounting tab 26 to avoid inadvertent activation of the vehicle motion sensor.

Figures 5, 6:
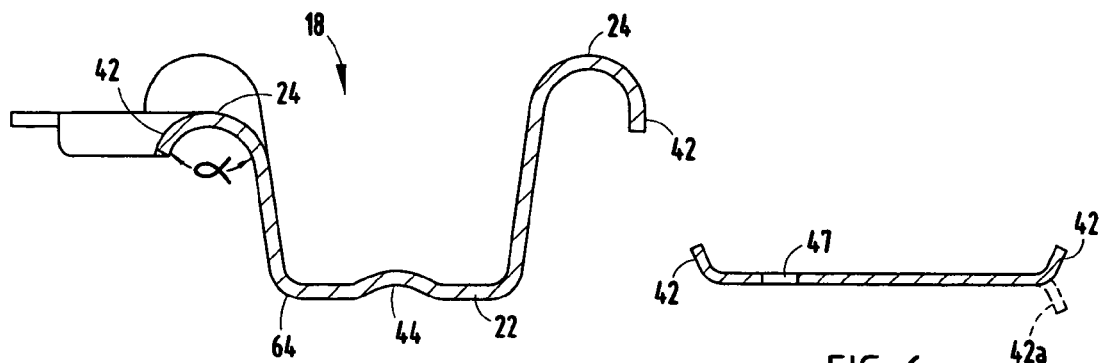
FIG. 5 is an enlarged, cross-sectional view of the structural door beam taken at line V—V of FIG. 2.
FIG. 6 is an enlarged, cross-sectional view of the mounting tab taken at line VI—VI of FIG. 3.

In the example shown FIG. 1, structural door beam 16, including the channel 18, mounting tab 26 and reinforcing flange 34 are integrally formed from high-strength steel. The channel 18, as shown in FIG. 5, has a generally U-shaped lateral cross-sectional configuration with side flanges 24 extending along both sides 38, 40 of the central web 22. Side flanges 24 have outer portions 42 that curve outwardly away from the central web 22. Outer portions 42 may curve to either side relative to the central web 22, as illustrated in FIG. 6 by outer portion 42a. Central web 22 includes an arcuate stiffening rib 44 extending longitudinally along a central portion 46 of the web 22. The open channel 18 extends across the lateral extent of the structural door beam 16. On both the right and left sides, the open channel 18 tapers off and the open section configuration becomes substantially planar. The side flange 24 extending across the lateral extent of the structural door beam 16 also tapers substantially on both the right and left sides of the structural door beam 16. The right end of the structural door beam bends at approximately 90 degrees from the longitudinal extent of the door beam 16.

As shown in FIGS. 1–4, the illustrated mounting tab 26 projects outwardly from a side edge 28 of the side flange 24. The mounting tab 26 may be located at the top or bottom of the door beam 16 and at any location across the lateral extent of the door beam 16. The mounting tab can be of varying sizes and shapes and may project outwardly any predetermined distance from the side edge 28 of the side flange 24.

The illustrated mounting tab 26 has means in the form of an aperture 47 for supporting a vehicle motion sensor, wire harness run, secondary reinforcing beam, etc. The aperture 47 extends through the mounting surface 32, and the shape of the aperture 47 is bounded only by the marginal edge 30 of the mounting tab 26. Furthermore, the mounting tab 26 has means in the form of a slot 48 for supporting a vehicle motion sensor, wire harness run, secondary reinforcing beam, etc. The slot 48 extends through the marginal edge 30 of the mounting tab 26 and terminates at a predetermined position inside the marginal edge 30 of the mounting tab 26. The slot 48 can vary in length, width and thickness. In addition, the slot 48 can be disposed at any angle relative to the lateral extent of the door beam 16.

Figure 2:
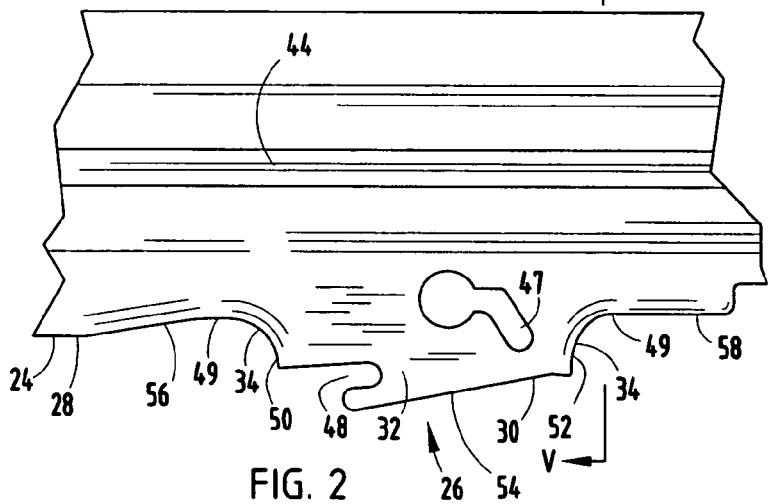
FIG. 2 is an enlarged, fragmentary, rear elevational view of a mounting tab portion of the structural door beam illustrated in FIG. 1.
Figure 3:
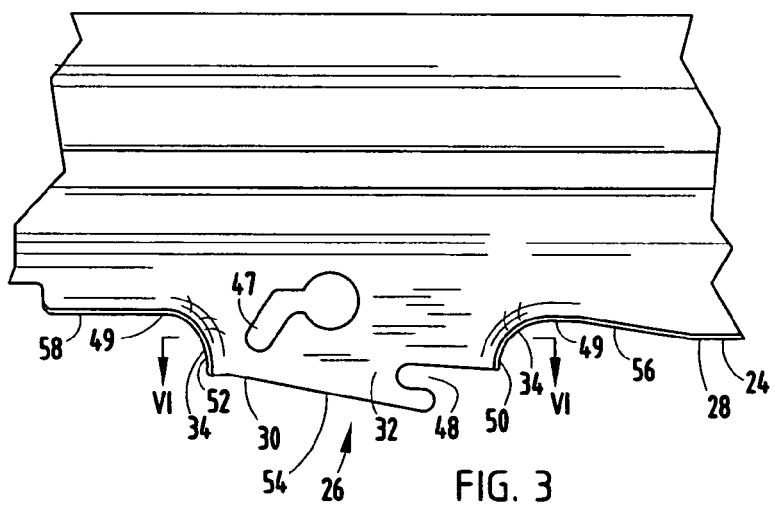
FIG. 3 is an enlarged, fragmentary, front elevational view of the mounting tab portion of the structural door beam illustrated in FIG. 1.
Figure 4:
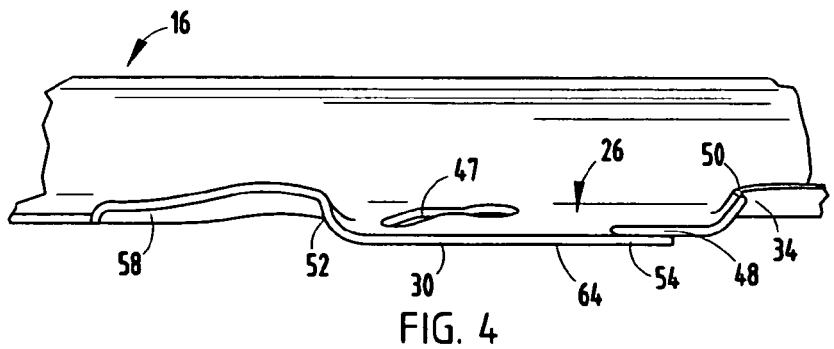
FIG. 4 is an enlarged, fragmentary, bottom plan view of the mounting tab portion of FIG. 1.

The reinforcing flange 34 shown in FIGS. 1–6 includes an arcuate medial portion 49 disposed between the side edge 28 of the flange 34 and the marginal edge 30 of the mounting tab 26. The flange 34 may have a J-shaped elevational configuration and an arcuate lateral cross section. The marginal edge 30 (FIGS. 1–4) has a first side portion 50, a second side portion 52 and an end portion 54 extending between the first side portion 50 and the second side portion 52. As illustrated in FIGS. 2–4, the reinforcing flange 34 has a first reinforcing flange 56 and a second reinforcing flange 58, wherein the first reinforcing flange 56 extends along a predetermined portion of the first side portion 50, and the second reinforcing flange 58 extends along a predetermined portion of the second side portion 52. The first and second reinforcing flanges 56, 58 define first and second integral buttresses, respectively, that further stiffen the mounting tab 26. Both the first and second reinforcing flanges 56, 58 protrude laterally at a predetermined angle α relative to the mounting surface 32 and, further, curve laterally toward an exterior portion 64 of the door beam 16.

The door beam of FIGS. 1–6 is preferably made by forming, from a strip of steel, the elongate channel 18 having the open section configuration defined by the central web 22. The at least one side flange 24 is formed and extends along one side of the central web 22 and has an outwardly projecting side edge. The mounting tab 26 is also integrally formed from the strip of steel. The mounting tab 26 is formed to project outwardly from the side edge 28 of the side flange 24 and have the marginal edge 30 surrounding the generally planar mounting surface 32.

As illustrated in FIGS. 2–5, one or more reinforcing flanges 56, 58 are added during the forming process to strengthen and stabilize the mounting tab 26. The reinforcing flanges 56, 58 are formed into components that are formed in either hot or cold stamping processes, utilizing multiple media for material (i.e., ultra high-strength and carbon steels). The reinforcing flanges 56, 58 can be formed in varying thicknesses and at varying lengths to accommodate specific applications. Furthermore, reinforcing flanges 56, 58 can be formed into the structural door beam 16 at a non-constant "varying" pitch and can be formed in either die direction. Specifically, the reinforcing flanges 56, 58 can be formed to protrude inwardly or outwardly relative to the orientation of the door beam 16 as installed in a vehicle.

The reference numeral 16a (FIGS. 7–10) generally designates another embodiment of the present invention, having at least one reinforcing bead 80. Since structural door beam 16a is similar to the previously described structural door beam 16, similar parts appearing in FIGS. 1–6 and FIGS.

7–10 respectively are represented by the same corresponding references numerals, except for the suffix "a" in the numerals of the latter.

Structural door beam 16a includes an elongate channel 18a having an open section configuration defined by a central web 22a and at least one side flange 24a extending along one side of a central web 22a. A mounting tab 76 projects outwardly from the side flange 24a and has a marginal edge 77 surrounding a generally planar mounting surface 78 configured to support a vehicle motion sensor thereon. An integral reinforcing bead 80 extends transversely along a predetermined portion 82 of the mounting surface 78 of the mounting tab 76 and an adjacent portion 84 of the side flange 24a. Further, the reinforcing bead 80 protrudes laterally from the mounting surface 78 of the mounting tab 76 and an adjacent portion 84 of the side flange 24a, to define an integral buttress which stiffens the mounting tab 76 to avoid inadvertent activation of the vehicle motion sensor thereon.

Figure 7:
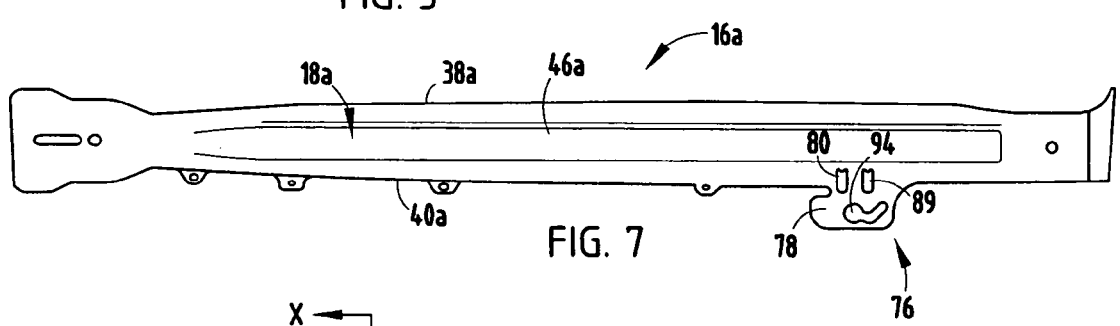
FIG. 7 is a front elevational view of another embodiment of the structural door beam of the present invention.

As shown in FIG. 7, the illustrated mounting tab 76 projects outwardly from a side flange 24a. The mounting tab 76 may be located at the top or bottom of the door beam 16a and at any location across the lateral extent of the door beam 16a. The mounting tab 76 can be of varying sizes and shapes and may project outwardly any predetermined distance from the side flange 24a.

Figures 8, 9:
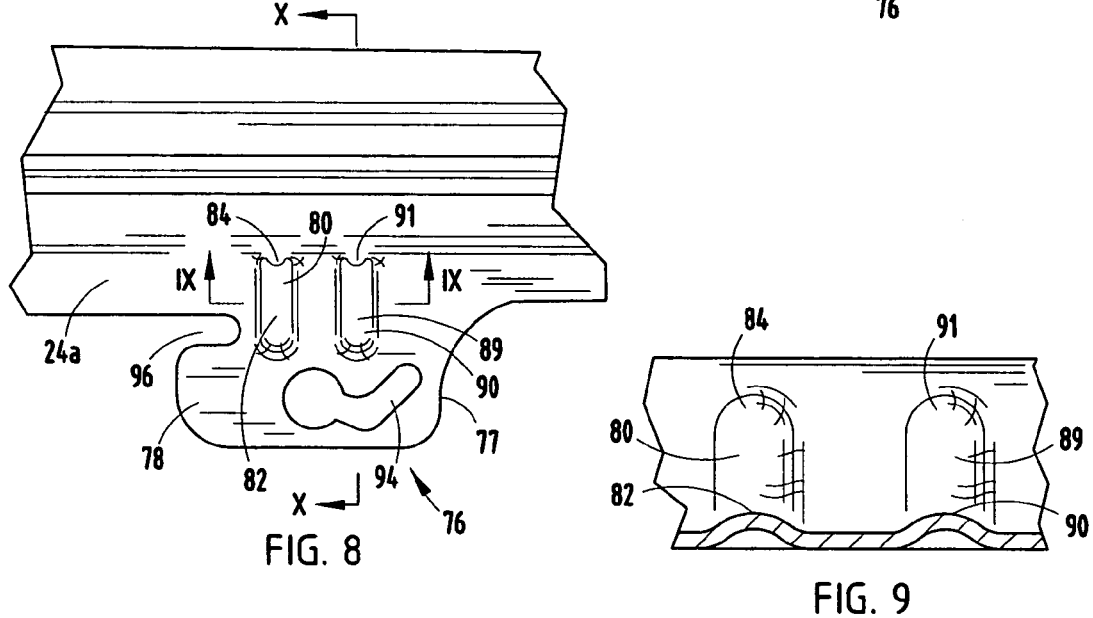
FIG. 8 is an enlarged, fragmentary, front elevational view of a mounting tab portion of the structural door beam illustrated in FIG. 7.
FIG. 9 is an enlarged, fragmentary, cross-sectional view of the structural door beam taken at line IX—IX of FIG. 8.
Figure 10:
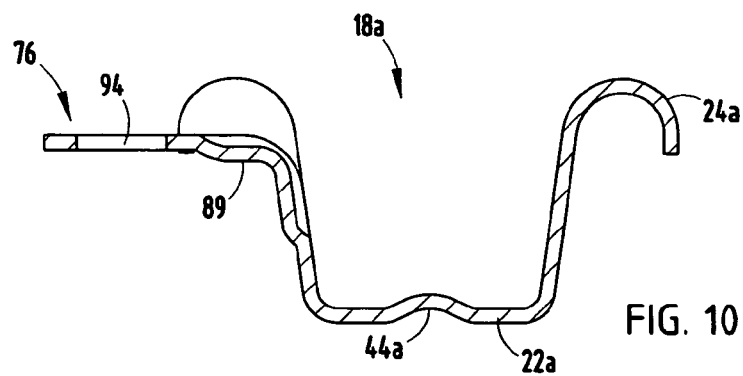
FIG. 10 is an enlarged, fragmentary, cross-sectional view of the structural door beam taken at line X—X of FIG. 8.

The mounting tab 76 illustrated in FIGS. 7 and 8 has means in the form of an aperture 94 for supporting a vehicle motion sensor, wire harness run, secondary reinforcing beam, etc. The aperture 94 extends through the mounting surface 78 and the shape of the aperture 94 is bounded only by the marginal edge 77 of the mounting tab 76. Furthermore, the mounting tab 76 has means in the form of a slot 96 (shown in FIG. 8) for supporting a vehicle motion sensor, wire harness run, secondary reinforcing beam, etc. The slot 96 extends through the marginal edge 77 of the mounting tab 76 and terminates at a predetermined position inside the marginal edge 77 of the mounting tab 76. The slot 96 can vary in length, width and thickness. In addition, the slot 96 can be disposed at any angle relative to the lateral extent of the door beam 16a.

The reinforcing bead 80 shown in FIGS. 7–9 has a generally L-shaped side elevational configuration, and a generally arcuate lateral cross-sectional configuration. A second reinforcing bead 89 may be spaced laterally apart from the first reinforcing bead 80. The second reinforcing bead 89 extends transversely along a second predetermined portion 90 of the mounting surface 78 of the mounting tab 76 and a second adjacent portion 91 of the side flange 24a. Further, the second reinforcing bead 89 protrudes laterally from the mounting surface 78 of the mounting tab 76 and the second adjacent portion 91 of the side flange 24a. A second integral buttress is formed by the second reinforcing bead 89 which further stiffens the mounting tab 76.

The structural door beam 16a, including the channel 18a, mounting tab 76 and the reinforcing bead 80, are preferably integrally stamped from a sheet of high-strength steel. During manufacture, the channel 18a, mounting tab 76 and the reinforcing bead 80 are substantially contemporaneously stamped. The channel 18a may have a generally U-shaped lateral cross-sectional configuration with side flanges 24a extending along both sides 38a, 40a of the central web 22a. The side flanges 24a may have outer portions that curve outwardly in opposite directions away from the central web 22a. The central web 22a may include a stiffening rib 44a extending longitudinally along a central portion 46a of the web 22a.

The illustrated mounting tab 76 has means for supporting a vehicle motion sensor that may include at least one aperture 94 extending through the mounting surface 78 or at least one slot 96 extending through the marginal edge 77 of the mounting tab 76. Further, the reinforcing bead 80 may be used in combination with the reinforcing flange 34 shown in FIGS. 1–5.

As illustrated in FIGS. 7–9, one or more reinforcing beads 80, 89 are added during the forming process to strengthen and stabilize the mounting tab 26. The reinforcing beads 80, 89 are formed into door beam 16a that are formed in either hot or cold stamping processes, utilizing multiple media for material (i.e., ultra high-strength and carbon steels). The reinforcing beads 80, 89 can be formed in varying thicknesses and at varying lengths to accommodate specific applications. Further, a non-constant, varying radii may be used to form the reinforcing beads 80, 89 into the door beam 16a. In addition, the reinforcing beads 80, 89 can be formed at any angle and in either die direction. Stated differently, the reinforcing beads 80, 89 can be formed to protrude inwardly or outwardly relative to the orientation of the door beam 16 as installed in a vehicle. The number and position of reinforcing beads 80, 89 can also be varied to achieve those characteristics desired for a particular application.

The mounting tab 76 of structural door beam 16a can be strengthened or rigidified further by providing one or more integral reinforcing flanges, similar to flanges 56 and/or 58 of structural door 1. Similarly, structural door beam 1 can be strengthened or rigidified further by providing one or more integral reinforcing beads, similar to beads 80 and/or 89 of structural door beam 16a.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is as follows:

1. A structural door beam for vehicles, comprising:
   an elongate channel having an open section configuration defined by a central web and at least one side flange extending along one side of the central web and having an outwardly projecting side edge;
   a mounting tab projecting outwardly from said side edge of said side flange, and having a marginal edge surrounding a generally planar mounting surface configured to support a vehicle motion sensor thereon; and
   an integral reinforcing flange extending continuously along a predetermined portion of said side edge of said side flange and a predetermined portion of said marginal edge of said mounting tab, and protruding laterally at a predetermined angle relative to said mounting surface of said mounting tab to define an integral buttress which stiffens said mounting tab to avoid inadvertent activation of the vehicle motion sensor mounted thereon.

2. A structural door beam as set forth in claim 1, wherein:
   said reinforcing flange has an arcuate medial portion disposed between said predetermined portion of said side edge of said flange and said predetermined portion of said marginal edge of said mounting tab.

3. A structural door beam as set forth in claim 2, wherein:
   said reinforcing flange has a generally J-shaped elevational configuration.

4. A structural door beam as set forth in claim 3, wherein:
said reinforcing flange has a generally arcuate lateral cross-sectional configuration.

5. A structural door beam as set forth in claim 4, wherein:
said marginal edge of said mounting tab includes opposite side portions and an end portion extending therebetween; and
said reinforcing flange extends along a predetermined portion of a first one of said side portions.

6. A structural door beam as set forth in claim 5, wherein:
said reinforcing flange defines a first reinforcing flange; and including
a second integral reinforcing flange extending continuously along a second predetermined portion of said side edge of said side flange and a predetermined portion of a second one of said side portions of said marginal edge of said mounting tab.

7. A structural door beam as set forth in claim 6, wherein:
said second integral reinforcing flange protrudes laterally at a predetermined angle relative to said mounting surface of said mounting tab to define a second integral buttress which further stiffens said mounting tab.

8. A structural door beam as set forth in claim 7, wherein:
said first and second reinforcing flanges curve laterally toward an exterior portion of said door beam.

9. A structural door beam as set forth in claim 8, wherein:
said mounting tab includes means associated with said mounting surface for supporting the vehicle motion sensor thereon.

10. A structural door beam as set forth in claim 9, wherein:
said supporting means includes at least one aperture extending through said mounting surface.

11. A structural door beam as set forth in claim 10, wherein:
said supporting means includes at least one slot extending through said marginal edge of said mounting tab.

12. A structural door beam as set forth in claim 11, wherein:
said channel, said mounting tab and said reinforcing flange are integrally stamped from a sheet of high-strength steel.

13. A structural door beam as set forth in claim 12, wherein:
said channel has a generally U-shaped lateral cross-sectional configuration with side flanges extending along both sides of said central web.

14. A structural door beam as set forth in claim 13, wherein:
said side flanges include outer portions which curve outwardly in opposite directions away from said central web.

15. A structural door beam as set forth in claim 14, wherein:
said central web includes a stiffening rib extending longitudinally along a central portion thereof.

16. A structural door beam as set forth in claim 1, wherein:
said reinforcing flange has a generally J-shaped elevational configuration.

17. A structural door beam as set forth in claim 1, wherein:
said reinforcing flange has a generally arcuate lateral cross-sectional configuration.

18. A structural door beam as set forth in claim 1, wherein:
said marginal edge of said mounting tab includes opposite side portions and an end portion extending therebetween;
said reinforcing flange extends along a predetermined portion of a first one of said side portions;
said reinforcing flange defines a first reinforcing flange; and including
a second integral reinforcing flange extending continuously along a second predetermined portion of said side edge of said side flange and a predetermined portion of a second one of said side portions of said marginal edge of said mounting tab.

19. A structural door beam as set forth in claim 18, wherein:
said second integral reinforcing flange protrudes laterally at a predetermined angle relative to said mounting surface of said mounting tab to define a second integral buttress which further stiffens said mounting tab.

20. A structural door beam as set forth in claim 1, wherein:
said reinforcing flange curves laterally toward an exterior portion of said door beam.

21. A structural door beam as set forth in claim 1, wherein:
said mounting tab includes means associated with said mounting surface for supporting the vehicle motion sensor thereon.

22. A structural door beam as set forth in claim 1, wherein:
said mounting surface includes at least one aperture extending therethrough for mounting the vehicle motion sensor thereon.

23. A structural door beam as set forth in claim 1, wherein:
said mounting surface includes at least one slot extending through a marginal edge of said mounting tab for mounting the vehicle motion sensor on said mounting surface.

24. A structural door beam as set forth in claim 1, wherein:
said channel, said mounting tab and said reinforcing flange are integrally stamped from a sheet of high-strength steel.

25. A structural door beam for vehicles, comprising:
an elongate channel having an open section configuration defined by a central web and at least one side flange extending along one side of said central web;
a mounting tab projecting outwardly from said side flange, and having a marginal edge surrounding a generally planar mounting surface configured to support a vehicle motion sensor thereon; and
an integral reinforcing bead extending transversely along a predetermined portion of said mounting surface of said mounting tab and an adjacent portion of said side flange to define an integral buttress which stiffens said mounting tab to avoid inadvertent activation of the vehicle motion sensor thereon.

26. A structural door beam as set forth in claim 25, wherein:
said reinforcing bead has a generally L-shaped side elevational configuration.

27. A structural door beam as set forth in claim 26, wherein:
said reinforcing bead has a generally arcuate lateral cross-sectional configuration.

28. A structural door beam as set forth in claim 27, wherein:
   said reinforcing bead defines a first reinforcing bead; and including
   a second integral reinforcing bead spaced laterally apart from said first integral reinforcing bead, and extending transversely along a second predetermined portion of said mounting surface of said mounting tab and an adjacent portion of said side flange, and protruding laterally from said mounting surface of said mounting tab and said second named adjacent portion of said side flange to define a second integral buttress which further stiffens said mounting tab.

29. A structural door beam as set forth in claim 28, wherein:
   said channel, said mounting tab and said first and second reinforcing beads are integrally stamped from a sheet of high-strength steel.

\* \* \* \* \*